Feb. 5, 1935.  A. C. NIEMAN  1,989,768
APPARATUS FOR INSERTING VALVES IN PIPE LINES
Filed Dec. 7, 1933  4 Sheets-Sheet 2
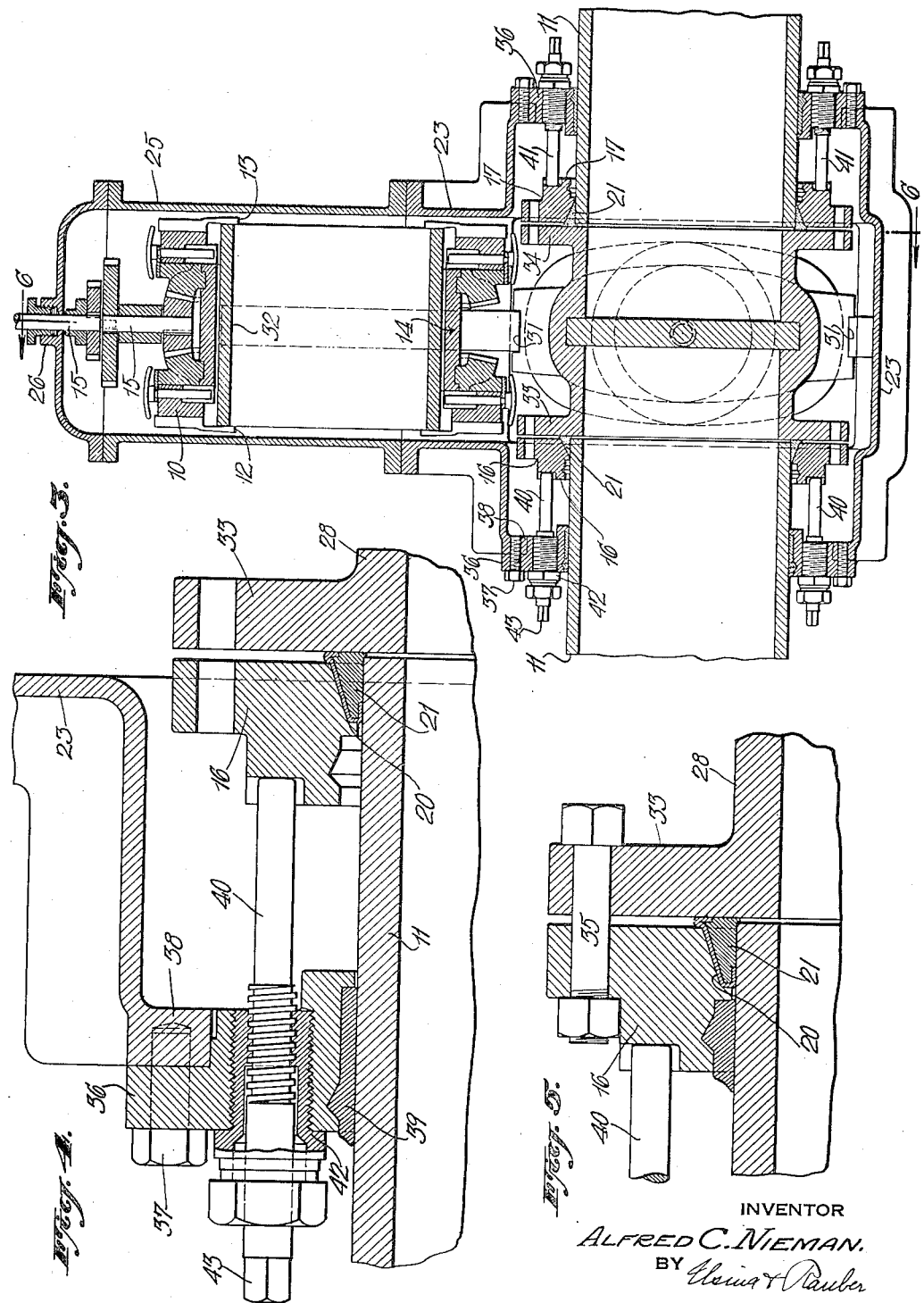
INVENTOR
Alfred C. Nieman.
BY
ATTORNEYS

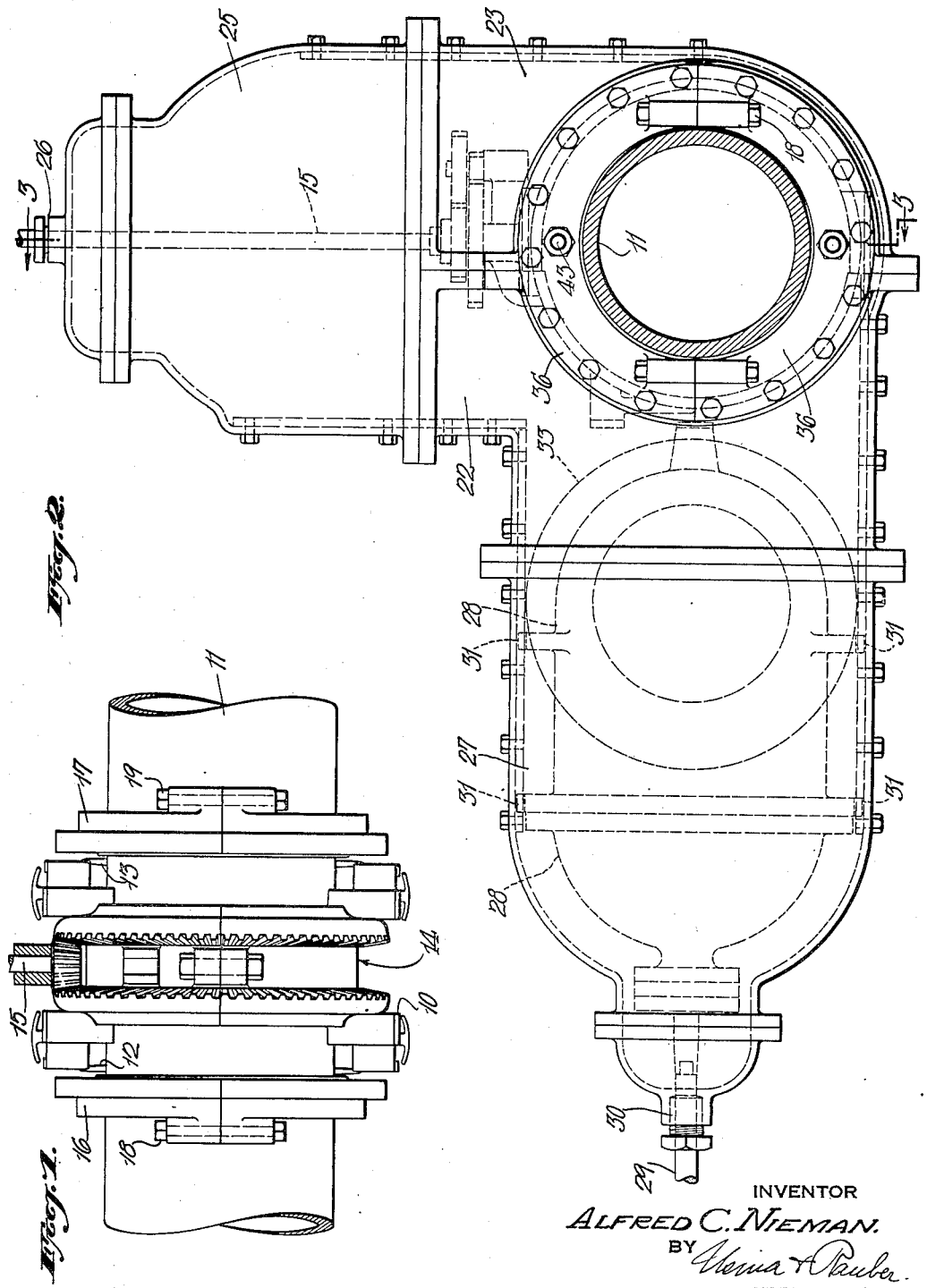

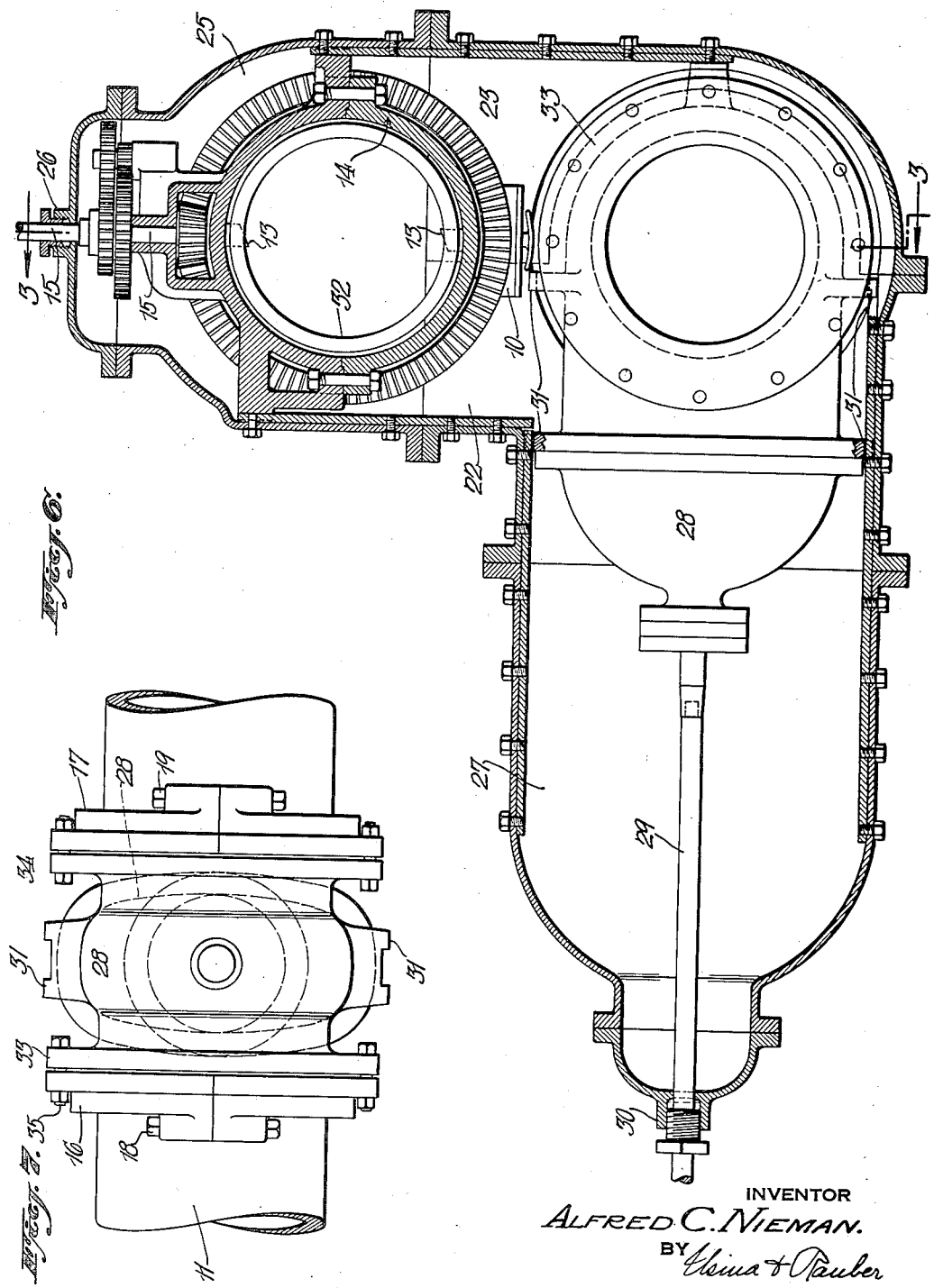

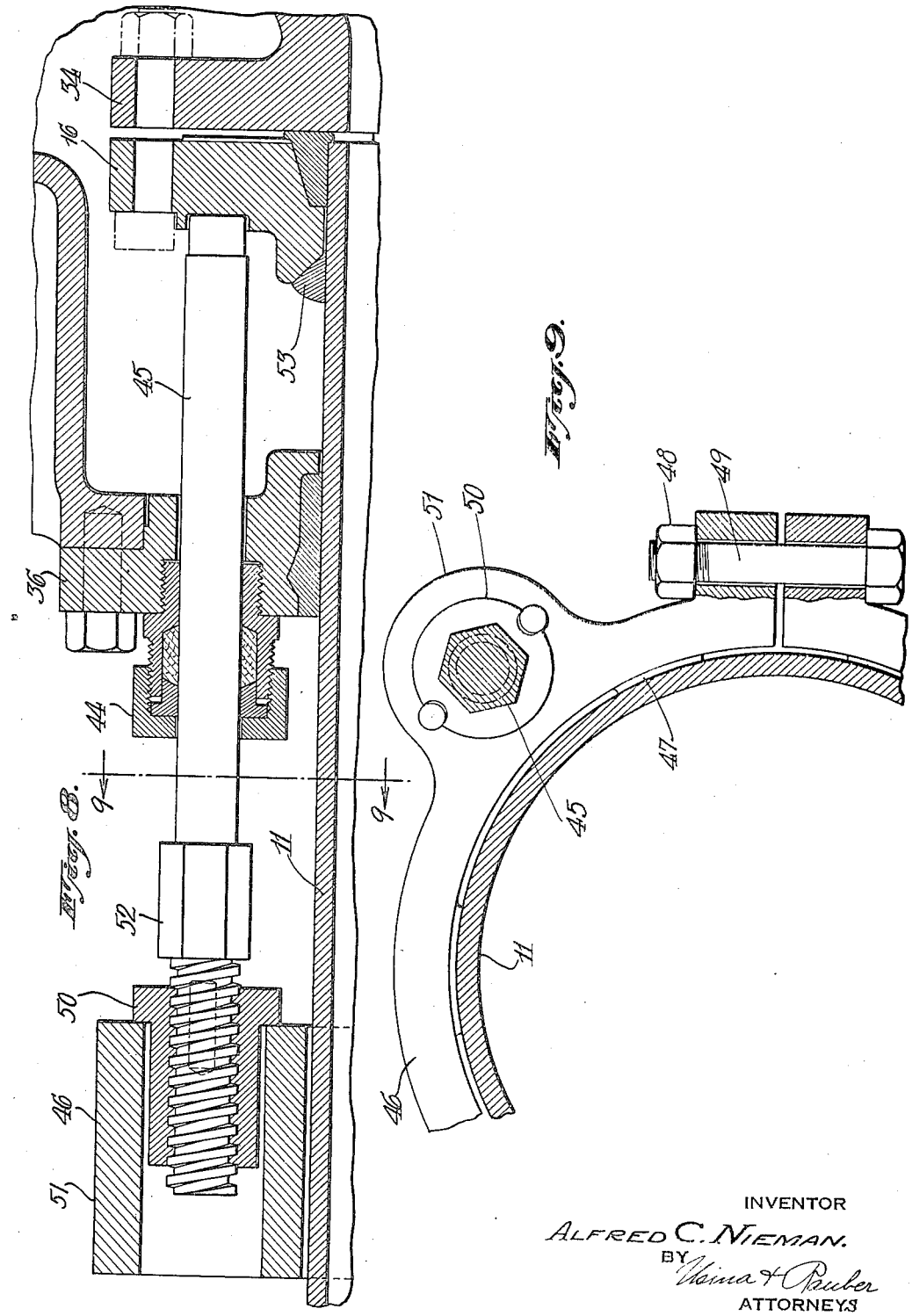

Patented Feb. 5, 1935

1,989,768

UNITED STATES PATENT OFFICE 1,989,768

APPARATUS FOR INSERTING VALVES IN PIPE LINES

Alfred C. Nieman, Newark, N. J.

Application December 7, 1933, Serial No. 701,288

11 Claims. (Cl. 77—41)

My present invention relates to a method and apparatus whereby valves, particularly double flanged valves of any type or size may be inserted in a pipe line while the latter is in use, or while it contains fluid, either liquid or gaseous, under pressure.

The apparatus is of a type in which the pipe line is cut to remove a short section thereof and the valve inserted and fitted in place of the section while the pipe is enclosed about the cut to prevent escape or loss of any of the fluid in the pipe.

Heretofore, when a valve was to be inserted in a pipe line filled with fluid or gas, a housing or chamber was fitted about the pipe at the place where the valve was to be inserted, a pipe cutter having been inserted about the pipe so as to be enclosed in the housing and being connected through the housing so that it could be rotated and operated.

When a short length or section of pipe had been cut by the pipe cutter, the latter was lifted into an extension of the housing, which extension was thereafter cut or sealed from communication with the part of the housing encircling the pipe; the pipe cutter was removed from the extension, replaced by a valve and after the extension was again replaced and placed into communication with the main part of the housing; this valve was lowered into alignment with the pipe and connected and sealed therein by means of a slidable collar, previously mounted on the pipe at one side of the cutter.

This method and apparatus for inserting the valves was not adaptable for inserting double flanged valves and it was limited to inserting the valve into alignment with the pipe by lowering it through its stem which limited the position of the valve to one in which the valve stem was vertical. The lowering of the valve into exact alignment with the pipe was also difficult.

Objects of my invention are to provide a method and an apparatus that will permit a pipe to be cut while in use or filled with fluid and a double flanged valve to be inserted and connected in the pipe or pipe line; to provide apparatus whereby a valve may be inserted in a pipe line while the latter is in use or filled with fluid, with the valve or valve stem arranged in any desired position or direction; to provide an apparatus for cutting a pipe line and inserting a valve therein in which the pipe line is entirely enclosed about the section to be replaced by the valve and in which the pipe is cut and the valve inserted without opening the enclosure.

Other objects of the invention are to provide valve flanges and packing for the pipe line, particularly advantageous for inserting and sealing the valve in the pipe line.

Other objects and features of the invention will appear from the following description. Various features of the invention being illustrated in the accompanying drawings in which Fig. 1 shows a pipe having mounted thereon a double cutter pipe and flanges to be used in connecting a double flanged valve; Fig. 2 is a side view of an apparatus embodying a preferred form of the invention; Fig. 3 is a vertical sectional view taken on the line 3—3 of Fig. 2; Figs. 4 and 5 are a detail sectional view of a pipe and valve flange and connecting mechanism; Fig. 6 is a vertical section of the apparatus taken on line 6—6 of Fig. 3; Fig. 7 is a side view of the pipe line with the valve inserted in position therein; Fig. 8 is a radial sectional view of a portion of a pipe and mechanism showing a modified form of means for setting the attaching clamps for larger size pipe, and Fig. 9 is a part sectional view on line 9—9 of Fig. 8.

In my invention a pair of split or sectional rings or flanges are slidably mounted in spaced relation of a valve on opposite sides of a pipe cutter positioned to cut the section from the pipe sufficient to permit the insertion of the valve. A sectional chamber is mounted on the pipe about and enclosing the cutter and the slidable rings or flanges. This chamber has an extension into and through which there extends a stem for operating the pipe cutter. When the section of pipe has been cut, it, together with the pipe cutter, is lifted into this extension of the chamber or housing.

Another extension of the chamber contains a double flanged valve positioned and guided so that it may be moved through the medium of a slidable rod into the space cut from the pipe by the pipe cutter. The valve is then in position between the two movable rings or flanges and the latter are pushed, sliding on the pipe, into contact with the flanges of the valve. The slidable rings have gasket recesses containing ring-shaped gaskets which seal against the flanges of the valve and against the surface of the pipe when these rings or flanges are clamped in position thereby sealing the pipe at opposite sides of the valve, thereupon the housing may be opened, the valve connected in place by bolts and the housing entirely removed.

Referring more particularly to Fig. 1 of the drawings, a pipe cutter 10 is mounted on a pipe or pipe line 11 and is provided with sets of cutters 12 and 13 positioned to cut the pipe at a spaced interval corresponding to the position to be occupied by the valve. These cutters are rotatable by a differential gearing 14, of any suitable construction, which is rotatable by a shaft 15. The pipe cutter may be of any usual type or construction and is in two parts so that it may be assembled about the pipe.

Mounted on opposite sides of the pipe cutter are sectional rings or slidable flanges 16 and 17. These rings or flanges are also split or sectional so that they may be assembled about the pipe 11 and joined by suitable bolts 18 and 19 respectively. Each of said slidable rings or gaskets 16 and 17 is provided with an inclined recess 20, as shown more particularly in Figs. 4 and 5, in which a packing ring 21 of rubber, metal, composition or other suitable material is fitted.

When the pipe cutter 14 and the flanges 16 and 17 have been mounted on the pipe, and before the pipe is cut, a housing or chamber is mounted on the pipe in position to enclose the pipe cutter and flanges so that when the pipe is cut the housing will prevent escape or loss of fluid from the interior of the pipe.

This housing is made in sections so that it may be assembled about the pipe. As shown in Fig. 2 it comprises a section 22 having a recess to enclose half of a pipe and a section 23 having a recess to enclose the other half, entirely surrounding the pipe at the place where the latter is to be cut. These various parts are assembled by means of suitable flanges and bolts.

Extending at a right angle to the axis of the pipe 11 is a section 25 forming an extension of the housing formed by the sections 22 and 23. Through this extension passes the shaft 15 for operating the cutter 14, the shaft passing through a stuffing box 26 in the section 25 to the exterior of the housing. Another section 27 is also at a right angle to the axis of the pipe 11 and in substantially the same plane as the section 25 and joined to the section 22 and second extension of the housing of the chamber.

Within the section 27, before it is joined to the section 22, there is placed a valve 28, the stem 29 of which extends through a stuffing box 30 of the section so that the valve may be moved longitudinally of the section 27 into a position whereby it will be in alignment with the pipe 11. The interior surface of the section 27 is so shaped as to provide a guiding surface for the valve 28, the latter being provided with projections 31 on opposite sides to slide on the guiding surface.

When the apparatus has been assembled about the pipe 11, the shaft 15 is rotated to cause the cutters 12 and 13 to move circumferentially of the pipe 11 and to cut into the latter until the section of pipe between the cutters has been entirely severed; thereafter the shaft 15 is pulled outwardly or upwardly lifting the pipe cutter and a section, 32, of the pipe upwardly into the extension formed by the section 25, as shown in Fig. 6. When drawn upwardly into the section 25, the space between the cut ends of the pipe is entirely free, thereupon the valve 28 is slid by means of the stem 29 inwardly until the axis of its bore is in alignment with the axis of the pipe 11. The thickness of the valve 28 between its flanges 33 and 34 is such that the valve will slide easily into the space between the cut ends of the pipe, as shown in Fig. 3. The bore through the valve 28 is such that its inner surface is substantially continuous with the inner surface of the pipe 11, thereupon the slidable rings or flanges 16 and 17 are forced along the pipe tightly into contact with the flanges 33 and 34 respectively, the packing 21 in the flanges or rings being compressed between the outer surface of the pipe, the edges of the flanges 33 and 34 and inclined surface 20 of the sliding flanges so as effectively to pack and seal the valve flanges to the pipe. The interior of the pipe is thereby sealed from further communication with the interior of the housing or chamber; thereupon a section of the latter, for example, the sections 25, 22 and 27 may be removed and bolts 35 inserted through bolt holes in the flanges of the valve and the flanges 16 and 17 as indicated in Fig. 5.

The sliding rings or flanges 16 and 17 are thereby permanently drawn into tight engagement with the flanges of the valve permanently sealing the latter in position in the pipe line, thereafter the remainder of the housing may be entirely removed leaving the valve permanently inserted in the pipe, as shown in Fig. 7.

In order to enable the housing or chamber to fit different sizes or dimensions of pipes, the sections 22 and 23, in assembled position, form an opening about the pipe 11 somewhat larger than the largest size of pipe for which the apparatus is designed. The space between this opening and the outer surface of the pipe 11 is filled and closed by means of a split ring 36, shown in enlarged section in Fig. 4, which is bolted by means of stud screws 37 to a flange 38 of the sections 22 and 23, and is provided with a packing 39 closing tightly against the outer surface of the pipe 11. In this way the housing may be adapted to pipes of different sizes and effectively seal against the pipe.

The rings or sliding flanges 16 and 17 may be forced against the flanges 33 and 34 of the valve by any suitable means.

In the embodiment of the invention shown in Figs. 3 and 4, for small valves for low and medium pressures, threaded rods 40 and 41 are mounted at circumferentially spaced intervals in plugs 42 in the rings 36 and extending through these plugs are provided with squared outer end portions 43 through which the rods may be turned thereby threading them inwardly. The inner ends of the rods 40 are in abutment with the rings 16 and 17 and force the latter tightly into engagement against the flanges 33 and 34 of the valve 28. When a sufficiently tight closure has been formed the rods 40 and 41 will hold the rings in place while the sections 25, 22 and 27 are removed to enable the rings to be bolted permanently.

It will be understood that after the housing has been removed the stem 29 may be replaced by other valve stem actuating means. When valves are to be inserted into pipe lines of large diameter, the clamping ring arrangement of Figs. 8 and 9 is preferably employed. In this modification the screw threaded openings in the adapter ring 36 are replaced by stuffing boxes 44 through which pass push rods 45 that extend from the movable flange or ring 16 or 17 through the stuffing box to a sectional ring 46 which is clamped on to the pipe line outside of the housing, there being one such ring at each side of the housing. The sectional rings 46 are tightly secured to the outer surface of the pipe 11 by means of gripping elements 47 which are pressed tightly into the surface of the pipe by clamping bolts 48 passing through lugs 49 on the ring section. The ends of the rods 45 are threaded into sockets 50 mounted into ears 51 at spaced intervals about the periphery of the ring 46. Polygonal enlargements 52 on the rods 45 enable the latter to be turned in the sockets 50 so as to thread the rods lengthwise into the housing and press the slidable rings 16 or 17 tightly against the flanges 33 or 34 respectively of the valve being inserted, thereby to tightly seal the valve to the pipe. When this has been done all of the housing may be removed leaving only the ring 46 and the rods 45 and the ring 36 or parts thereof before the securing bolts are mounted in the valve flanges and rings. When the insertion and securing of the valve has been completed the slidable ring 16 may be welded to the pipe 11 as indicated at 53.

Various modifications may be made by those skilled in the art without departing from the invention as defined in the following claims.

What I claim is—

1. Apparatus for inserting valves in pipe lines which comprises a sectional chamber having aligned openings to enclose and seal about a pipe line, an extension of said chamber at a right angle to the axis of said pipe line to receive a pipe cutter for cutting out a section of said pipe and an extension of said chamber in substantially the plane of said cutter to contain a valve housing in position to slide into position between the severed ends of the cut made by said cutter and means to secure the housing of the valve directly to the pipe line independently of the chamber.

2. Apparatus for inserting valves in pipe lines which comprises a sectional chamber having aligned openings to enclose and seal about a pipe line, an extension of said chamber at a right angle to the axis of said pipe line to receive a pipe cutter for cutting out a section of said pipe and an extension of said chamber in substantially the plane of said cutter to contain a valve housing in position to slide into the cut made by said cutter and means to secure the housing of the valve directly to the pipe line independently of the chamber, said second extension having guiding surfaces for guiding said valve housing into alignment with said pipe openings.

3. Apparatus for inserting valves in pipe lines which comprises a sectional chamber having aligned openings to enclose and seal about a pipe line, adapter rings joined in said openings to reduce the latter to a desired diameter, an extension of said chamber at a right angle to the axis of said pipe line to receive a pipe cutter for cutting out a section of said pipe and an extension of said chamber in substantially the plane of said first cutter to contain a valve housing in position to slide into the cut made by said cutter.

4. Apparatus for inserting valves in pipe lines which comprises a sectional chamber having aligned openings to enclose and seal about a pipe line, an extension of said chamber at a right angle to the axis of said pipe line to receive a pipe cutter for cutting out a section of said pipe and an extension of said chamber in substantially the plane of said cutter to contain a valve in position to slide into the cut made by said cutter and means to secure the housing of the valve directly to the pipe line independently of the chamber, said chamber having stuffing boxes in said extensions through which said cutter and said valve housing may be moved.

5. Apparatus for inserting valves in pipe lines which comprises a sectional chamber having aligned openings to enclose and seal about a pipe line, said chamber being so sectioned that it may be assembled about a pipe to be cut, an extension of said chamber at a right angle to the axis of said pipe line to receive a pipe cutter for cutting out a section of said pipe and an extension of said chamber in substantially the plane of said first cutter to contain a valve housing in position to slide into the cut made by said cutter and means to secure the housing of the valve directly to the pipe line independently of the chamber.

6. Apparatus for inserting valves in pipe lines which comprises a sectional chamber having aligned openings to enclose and seal about a pipe line, an extension of said chamber at a right angle to the axis of said pipe line to receive a pipe cutter for cutting out a section of said pipe and an extension of said chamber in substantially the plane of said cutter to contain a valve housing in position to slide into the cut made by said cutter, means in said chamber to slide rings axially of the pipe openings in said chamber to seal the housing of the valve in position in the cut in said pipe independently of said chamber.

7. Apparatus for inserting valves in pipe lines which comprises a sectional chamber having aligned openings to enclose and seal about a pipe line, rings mounted in said openings to reduce said openings to a desired diameter, an extension of said chamber at a right angle to the axis of said pipe line to receive a pipe cutter for cutting out a section of said pipe and an extension of said chamber in substantially the plane of said cutter to contain a valve housing in position to slide into the cut made by said cutter and means mounted in said rings to force slidable rings within said chamber axially of the axis of said pipe openings to seal against said valve housing when positioned in said cut.

8. Apparatus for inserting valves in pipe lines which comprises a sectional chamber having aligned openings to enclose and seal about a pipe line, rings mounted in said openings to receive said openings to a desired diameter and means mounted in said rings to force slidable rings within said chamber axially of the axis of said pipe openings, said means comprising stems threaded through said adapter rings, an extension of said chamber at a right angle to the axis of said pipe line to receive a pipe cutter for cutting out a section of said pipe and an extension of said chamber in substantially the plane of said cutter to contain a valve housing in position to slide into the cut made by said cutter and to be sealed therein by said slidable rings.

9. Apparatus for inserting valves in pipe lines which comprises a sectional chamber having aligned openings to enclose and seal about a pipe line, an extension of said chamber at a right angle to the axis of said pipe line to receive a pipe cutter for cutting out a section of said pipe and an extension of said chamber in substantially the plane of said cutter to contain a valve housing in position to slide into the cut made by said cutter and means to secure the housing of the valve directly to the pipe line independently of the chamber, said extensions of said chamber being formed by removable sections.

10. A means for inserting flanged valves into pipe lines which comprises a sectional housing to enclose and seal a length of said pipe and to contain a pipe cutter and valve to be inserted, said housing having adapter rings through which said pipe extends, stuffing boxes at spaced intervals in said adapter rings, a clamping ring outside said adapted ring and having spaced threaded sockets aligned with said stuffing boxes of said adapter rings and push rods threaded at one end into said threaded sockets and extending through said stuffing boxes into said housing.

11. Apparatus for securing flanged valves in a pipe which comprises a sectional housing having openings through which said pipe extends and having spaces to contain a pipe cutter and a valve to be inserted between cuts of said pipe, smaller openings at spaced intervals about said pipe openings, stuffing boxes mounted in said smaller openings, a sectional ring outside said housing and having threaded sockets aligned with said stuffing boxes and a push rod threaded at one end in said sockets and extending through said stuffing boxes to the interior of said housing.

ALFRED C. NIEMAN.